(12) United States Patent
Wang et al.

(10) Patent No.: US 12,462,705 B2
(45) Date of Patent: Nov. 4, 2025

(54) QUESTION ANSWERING METHOD, ELECTRONIC DEVICE, AND PROGRAM PRODUCT

(71) Applicant: Dell Products L.P., Round Rock, TX (US)

(72) Inventors: Zijia Wang, WeiFang (CN); Jiacheng Ni, Shanghai (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 732 days.

(21) Appl. No.: 17/866,702

(22) Filed: Jul. 18, 2022

(65) Prior Publication Data

US 2023/0401971 A1    Dec. 14, 2023

(30) Foreign Application Priority Data

Jun. 10, 2022    (CN) .......................... 202210656906.3

(51) Int. Cl.
*G09B 7/00*    (2006.01)
*G06F 16/3329*    (2025.01)
*G06Q 30/016*    (2023.01)

(52) U.S. Cl.
CPC ........... *G09B 7/00* (2013.01); *G06F 16/3329* (2019.01); *G06Q 30/016* (2013.01)

(58) Field of Classification Search
None
See application file for complete search history.

(56) References Cited

U.S. PATENT DOCUMENTS

| 9,489,379 B1 | 11/2016 | Wu et al. |
| 11,388,244 B1 | 7/2022 | Ni et al. |
| 2005/0198200 A1 | 9/2005 | Subramanian et al. |

(Continued)

OTHER PUBLICATIONS

J. Devlin et al., "BERT: Pre-training of Deep Bidirectional Transformers for Language Understanding," arXiv:1810.04805v2, May 24, 2019, 16 pages.

(Continued)

*Primary Examiner* — James B Hull
(74) *Attorney, Agent, or Firm* — Ryan, Mason & Lewis, LLP

(57) ABSTRACT

Embodiments of the present disclosure relate to a question answering method, an electronic device, and a computer program product. The method includes: determining an answer library associated with a question; determining a restricted Boltzmann machine associated with the answer library, wherein the restricted Boltzmann machine is configured to determine a set of questions that the answer library can answer and association relationships between questions in the set of questions and the answer library; and determining, using the restricted Boltzmann machine, annotation information associated with the question and targeted to the answer library. With the technical solution of the present disclosure, it is possible to determine, while determining an answer library associated with the question, annotation information that is targeted to the answer library, and to enable customer service personnel to have a more thorough understanding of the determined answer library and obtain targeted recommendation information.

20 Claims, 4 Drawing Sheets

(56) References Cited

U.S. PATENT DOCUMENTS

| | | | |
|---|---|---|---|
| 2008/0002602 A1 | 1/2008 | Chen et al. | |
| 2009/0287678 A1* | 11/2009 | Brown | G06F 16/3344 707/999.005 |
| 2017/0220966 A1 | 8/2017 | Wang | |
| 2017/0278012 A1 | 9/2017 | Prasad et al. | |
| 2018/0012151 A1 | 1/2018 | Wang | |
| 2018/0095772 A1 | 4/2018 | Wu | |
| 2018/0095807 A1 | 4/2018 | Wu | |
| 2019/0122760 A1 | 4/2019 | Wang | |
| 2019/0137288 A1 | 5/2019 | Rahematpura et al. | |
| 2019/0253517 A1 | 8/2019 | Ciano et al. | |
| 2020/0314593 A1 | 10/2020 | Xu et al. | |
| 2020/0410163 A1 | 12/2020 | Shah et al. | |
| 2020/0410423 A1 | 12/2020 | Kalia et al. | |
| 2021/0406730 A1 | 12/2021 | Ni et al. | |
| 2022/0351635 A1* | 11/2022 | Stroup | G06N 7/01 |

OTHER PUBLICATIONS

A. Vaswani et al., "Attention Is All You Need," arXiv:1706.03762v5, 31st Conference on Neural Information Processing Systems, Dec. 6, 2017, 15 pages.

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781v3, Sep. 7, 2013, 12 pages.

G. S. Manku et al., "Detecting Near-Duplicates for Web Crawling," Proceedings of the 16th International Conference on World Wide Web. May 8-12, 2007, 9 pages.

R. Salakhutdinov et al., "Restricted Boltzmann Machines for Collaborative Filtering," Proceedings of the 24th International Conference on Machine Learning, Jun. 20-24, 2007, 8 pages.

B. Abdollahi et al., "Explainable Matrix Factorization for Collaborative Filtering," Proceedings of the 25th International Conference Companion on World Wide Web, Apr. 2016, 2 pages.

G. E. Hinton, "Training Products of Experts by Minimizing Contrastive Divergence," Neural Computation, vol. 14, No. 8, Aug. 2002, pp. 1771-1800.

G. E. Hinton, "Learning to Represent Visual Input," Philosophical Transactions of the Royal Society B, vol. 365, No. 1537, Jan. 12, 2010, pp. 177-184.

Wikipedia, "Supervised Learning," https://en.wikipedia.org/wiki/Supervised_learning, Jun. 16, 2022, 6 pages.

Wikipedia, "Unsupervised Learning," https://en.wikipedia.org/wiki/Unsupervised_learning, Jun. 28, 2022, 4 pages.

Wikipedia, "Joint Probability Distribution," https://en.wikipedia.org/wiki/Joint_probability_distribution, Jun. 23, 2022, 5 pages.

Wikipedia, "Partition Function (mathematics)" https://en.wikipedia.org/wiki/Partition_function_(mathematics), Nov. 7, 2021, 6 pages.

Wikipedia, "Normalizing Constant," https://en.wikipedia.org/wiki/Normalizing_constant, May 1, 2022, 3 pages.

Wikipedia, "Conditional Probability," https://en.wikipedia.org/wiki/Conditional_probability, Jul. 11, 2022, 9 pages.

Wikipedia, "Probability Distribution," https://en.wikipedia.org/wiki/Probability_distribution, Jul. 10, 2022, 12 pages.

* cited by examiner

QUESTION ANSWERING METHOD, ELECTRONIC DEVICE, AND PROGRAM PRODUCT

RELATED APPLICATION(S)

The present application claims priority to Chinese Patent Application No. 202210656906.3, filed Jun. 10, 2022, and entitled "Question Answering Method, Electronic Device, and Program Product," which is incorporated by reference herein in its entirety.

FIELD

Embodiments of the present disclosure relate generally to artificial intelligence technology, and specifically to a question answering method, an electronic device, and a computer program product, which can be used in the field of customer service.

BACKGROUND

Currently, with the development of artificial intelligence technology, it has become common in industries such as service industries to use computer-assisted techniques to help customer service personnel answer user questions. For example, an answer library for different questions or different kinds of questions may be stored in a customer service system in advance, and the answer library may include answers to some common questions or questions that have already been asked by users. When a user puts forward a question, which may also be referred to as a service request (SR), to customer service personnel through the customer service system with respect to the use of a certain application, the customer service system may determine, based on the user's question, an answer library associated with the user's question, and push the determined answer library or an identifier of the answer library to the customer service personnel. After receiving the pushed answer library or the pushed identifier of the answer library, the customer service personnel may refer to an answer to a question which has been asked by a user in the answer library, so as to answer the user. This way of determining the answer library by the customer service system based on the user question is a recommendation function and may be constructed as a recommendation system. A desirable recommendation system can be used to guide junior customer service personnel, thus saving the time of the junior customer service personnel that might otherwise need to consult senior customer service personnel in order to find answers.

However, conventional recommendation systems only provide an answer library associated with the user question and do not provide other useful information or sound advice, making it difficult to more effectively assist customer service personnel that use the recommendation system.

SUMMARY

Embodiments of the present disclosure provide a question answering method, an electronic device, and a computer program product.

In a first aspect of the present disclosure, a question answering method is provided. The method includes: determining an answer library associated with a question; determining a restricted Boltzmann machine (RBM) associated with the answer library, wherein the restricted Boltzmann machine is configured to determine a set of questions that the answer library can answer and association relationships between questions in the set of questions and the answer library; and determining, using the restricted Boltzmann machine, annotation information associated with the question and targeted to the answer library.

In a second aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: determining an answer library associated with a question; determining a restricted Boltzmann machine associated with the answer library, wherein the restricted Boltzmann machine is configured to determine a set of questions that the answer library can answer and association relationships between questions in the set of questions and the answer library; and determining, using the restricted Boltzmann machine, annotation information associated with the question and targeted to the answer library.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to perform any step of the method described according to the first aspect of the present disclosure.

This Summary is provided to introduce the selection of concepts in a simplified form, which will be further described in the Detailed Description below. The Summary is neither intended to identify key features or essential features of embodiments of the present disclosure, nor intended to limit the scope of embodiments of the present disclosure.

BRIEF DESCRIPTION OF THE DRAWINGS

The above and other objectives, features, and advantages of the present disclosure will become more apparent from the description of example embodiments provided herein in combination with the accompanying drawings. In the example embodiments of the present disclosure, the same reference numerals generally represent the same parts.

In the drawings, identical or corresponding numerals represent identical or corresponding parts.

DETAILED DESCRIPTION

Figure 1:
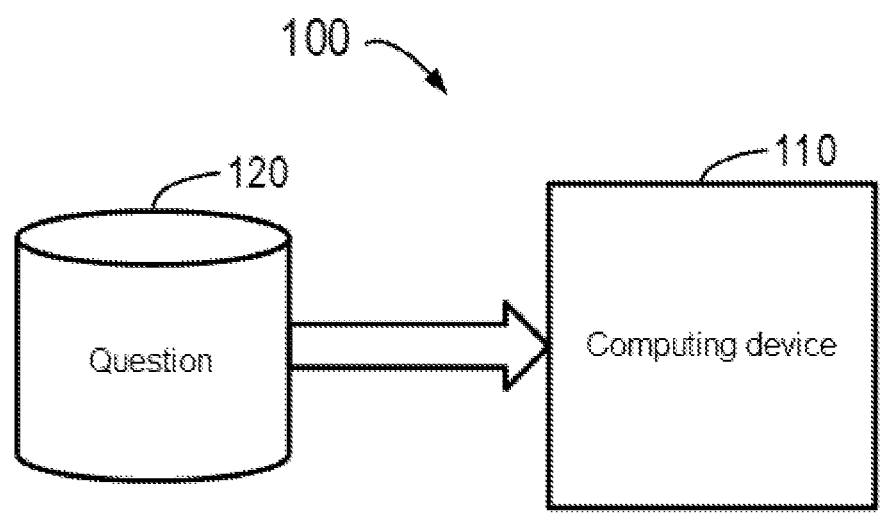
FIG. 1 illustrates a schematic diagram of an example question answering environment in which the device and/or the method according to embodiments of the present disclosure may be implemented.

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above, a desirable recommendation system can be used to guide junior customer service personnel, thus saving the time of the junior customer service personnel that might otherwise need to consult senior customer service personnel in order to find answers. However, conventional recommendation systems only provide an answer library associated with a user question and do not provide other useful information or sound advice, making it difficult to more effectively assist customer service personnel who use the recommendation system.

In order to at least partially solve one or more of the above problems and other potential problems, embodiments of the present disclosure provide a collaborative filtering recommendation method based on a restricted Boltzmann machine. With this method, by using a set of questions that can be answered by the answer library as positive samples and using a set of questions that cannot be answered by the answer library as negative samples, acquiring training association relationships between samples in the positive samples and in the negative samples and the answer library, and training a restricted Boltzmann machine using the positive samples, the negative samples, and the training association relationships, it is possible to enable the trained restricted Boltzmann machine to be used to determine a set of questions that the answer library can answer and association relationships between questions in the set of questions and the answer library. In this way, it is possible to determine, using the trained restricted Boltzmann machine, annotation information associated with the question and targeted at the answer library, and thus to provide the customer service personnel with the determined annotation information to enable the customer service personnel to have a more thorough understanding of the determined answer library and obtain targeted recommendation information, thus improving the user experience of the customer service personnel that uses the question answering system.

FIG. 1 illustrates a schematic block diagram of example question answering environment 100 in which the question answering method according to some embodiments of the present disclosure can be implemented. According to an embodiment of the present disclosure, question answering environment 100 may be a cloud environment.

As shown in FIG. 1, question answering environment 100 includes computing device 110. In question answering environment 100, for example, question 120, which may also be referred to as a service request, put forward by a user to customer service personnel through the customer service system with respect to the use of a certain application, is provided to computing device 110 as an input to computing device 110. According to an embodiment of the present disclosure, question 120 may include a title of the service request and an associated description filled in by the user, where the title may be freely filled in by the user or be selected by the user from options provided to the user by the customer service system, and the associated description may be a specific detailed question description provided by the user with respect to question 120.

After receiving question 120, computing device 110 may determine an answer library associated with the question, determine a restricted Boltzmann machine associated with the answer library, and use the restricted Boltzmann machine to determine annotation information associated with the question and targeted at the answer library.

It should be understood that example question answering environment 100 is only illustrative and not restrictive, and it is extensible or contractible. For example, more computing devices 110 may be included in example question answering environment 100, and more questions 120 may be provided as input to computing device 110, which allows the need for more users to simultaneously utilize more computing devices 110 to simultaneously or non-simultaneously acquire the recommended answer library and associated annotation information for more questions 120 to be satisfied.

Hereinafter, taking computing device 110 and question 120 included in FIG. 1 as examples, the specific operations performed by computing device 110 after receiving question 120 will be described in detail with reference to question answering method 200 shown in FIG. 2.

Figure 2:
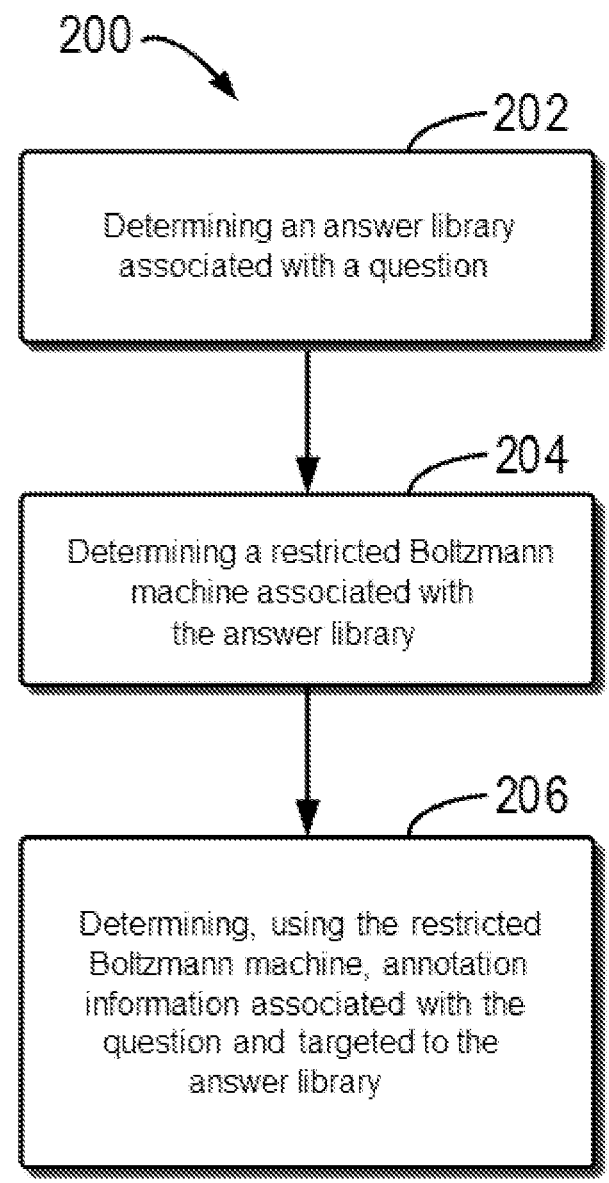
FIG. 2 illustrates a flow chart of a question answering method according to an embodiment of the present disclosure.

FIG. 2 illustrates a flow chart of question answering method 200 according to an embodiment of the present disclosure. Question answering method 200 may be implemented by computing device 110 shown in FIG. 1 or by other appropriate devices. It should be understood that question answering method 200 may also include additional steps that are not shown and/or may omit the shown steps, and the scope of embodiments of the present disclosure is not limited in this aspect.

At block 202, computing device 110 determines an answer library associated with question 120. According to an embodiment of the present disclosure, question 120 may be sent by the user to the customer service personnel through the customer service system. Question 120 may include a title of the service request and an associated description filled in by the user, where the title may be freely filled in by the user or be selected by the user from options provided to the user by the customer service system, and the associated description may be a specific detailed question description provided by the user with respect to question 120.

According to some embodiments of the present disclosure, based on at least one of the association between question 120 and questions that can be answered by each of a plurality of answer libraries and the association between question 120 and the answer libraries, computing device 110 may determine an answer library associated with question 120. For example, computing device 110 may cascade the words included in question 120 together, changing them all to lowercase letters if they are in a foreign language, and removing all punctuation marks to form a sequence of words corresponding to question 120. Thereafter, computing device 110 may, for example, determine the association between the formed sequence of words corresponding to question 120 and the questions that can be answered by the answer library or the answer library itself by calculating the semantic association between the sequence of words and the questions that can be answered by the answer library or the answer library itself, and then determine the answer library associated with question 120 from the plurality of answer libraries.

At block 204, computing device 110 may further determine a restricted Boltzmann machine associated with the answer library based on the answer library associated with question 120 as determined in block 202. According to an embodiment of the present disclosure, computing device 110 may pre-construct a restricted Boltzmann machine for each answer library. Thus, after determining the answer library associated with question 120, computing device 110 may further determine the restricted Boltzmann machine associated with that answer library.

According to an embodiment of the present disclosure, the restricted Boltzmann machine may be configured to determine a set of questions that the answer library can answer and association relationships between questions in the set of questions and the answer library, wherein the aforementioned capabilities of the restricted Boltzmann machine are associated with the training process of the restricted Boltzmann machine.

A restricted Boltzmann machine is a stochastic generative neural network that can learn probability distributions from an input data set. Restricted Boltzmann machines may be applied in aspects such as dimensionality reduction, classification, collaborative filtering, feature learning, and topic modeling. Depending on different tasks, the restricted Boltzmann machine may be trained using supervised or unsupervised learning methods, as is well known to those skilled in the art.

Specifically, the restricted Boltzmann machine is a special topological structure of a Boltzmann machine. The Boltzmann machine, of which the principle originates from statistical physics, is a modeling method based on energy functions and is capable of describing higher-order interactions between variables. The learning algorithm of the Boltzmann machine is complex and is a symmetrically coupled stochastic feedback type binary unit neural network consisting of a visible layer and multiple hidden layers, where the nodes in the visible layer may be called visible units and the nodes in the hidden layers may be called hidden units. In the Boltzmann machine, the learning model for stochastic networks and stochastic environments are expressed using visible and hidden units, and the correlation between units is expressed by weights.

The restricted Boltzmann machine is a variant of the Boltzmann machine, but the restricted model must be a bipartite graph. The model contains visible units corresponding to input parameters and hidden units corresponding to training results, and each edge must be connected with one visible unit and one hidden unit. This restriction makes possible more efficient training algorithms compared with general Boltzmann machines, especially the gradient-based contrast divergence algorithm. Therefore, the restricted Boltzmann machine can be used for deep learning networks.

In the restricted Boltzmann machine, each element in the weight matrix $W=(w_{i,j})$ specifies the weight of an edge between a hidden layer unit $h_j$ and a visible layer unit $v_i$. In addition, there is a bias $a_i$ for each visible layer unit $v_i$ and a bias $b_j$ for each hidden layer unit $h_j$. Under this definition, the "energy" (v, h) of the restricted Boltzmann machine configuration, i.e., given the value of each cell, is defined as:

$$E(v, h) = -\sum_i a_i v_i - \sum_j b_j h_j - \sum_i \sum_j h_j w_{i,j} v_i \tag{1}$$

or it may be expressed in the matrix form as follows:

$$E(v,h) = a^T v - b^T h - h^T W v \tag{2}$$

In a general restricted Boltzmann machine, the joint probability distribution between the hidden layers and the visible layer may be given by the following energy function:

$$P(v, h) = \frac{1}{Z} e^{-E(v,h)} \tag{3}$$

where Z is a partition function or standardization factor, which is defined as a normalization constant of which the sum of $e^{-E(v,h)}$ under all possible values of nodes, i.e., the sum of probability distribution, is 1. Similarly, the edge distribution of the values of the visible layer can be obtained by summing all the hidden layer configurations as follows:

$$P(v) = \frac{1}{Z} \sum_h e^{-E(v,h)} \tag{4}$$

Since the restricted Boltzmann machine is a bipartite graph with no edges connected within layers, given the values of the visible layer nodes, whether a hidden layer is activated or not is conditionally independent. Similarly, given the values of the hidden layers, the activation state of the visible layer nodes is also conditionally independent. That is, for m visible layer nodes and n hidden layer nodes, the conditional probability of the configuration v of the visible layer with respect to the configuration h of the hidden layers is as follows:

$$P(v|h) = \prod_{i=1}^{m} P(v_i|h) \tag{5}$$

Similarly, the conditional probability of h with respect to v is $$P(h|v) = \prod_{j=1}^{n} P(h_j|v) \tag{6}$$

The activation probability of a single node is $$P(h_j = 1|v) = \sigma\left(b_j + \sum_{i=1}^{m} w_{i,j} v_i\right) \text{ and } P(v_i = 1|h) = \sigma\left(a_i + \sum_{j=1}^{n} w_{i,j} h_j\right) \tag{7}$$

where σ represents a logic function.

Restricted Boltzmann machine 300 used in embodiments of the present disclosure will be described below with specific reference to FIG. 3.

Figure 3:
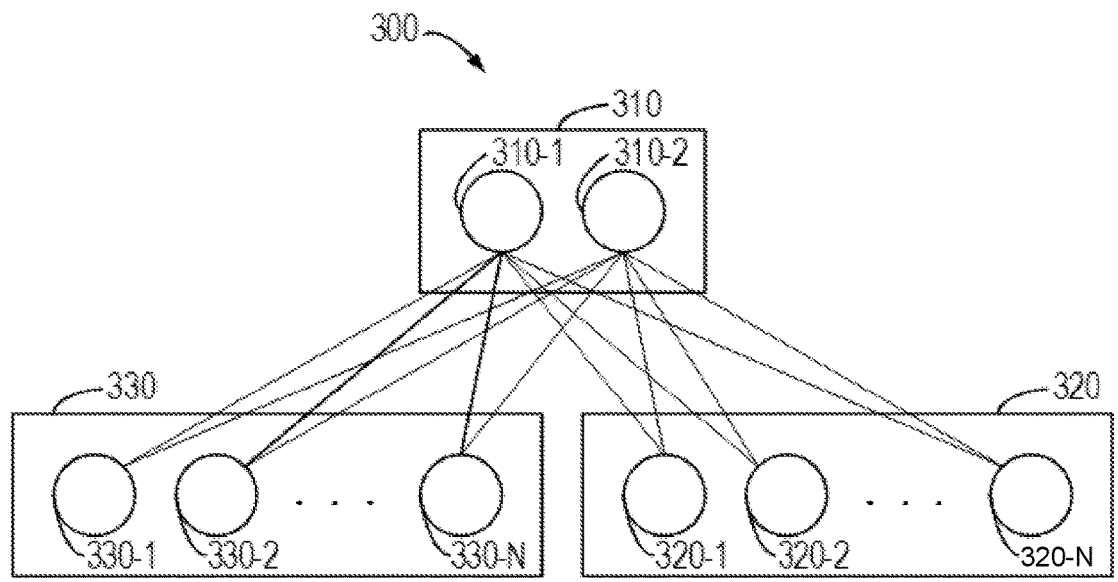
FIG. 3 illustrates a schematic diagram of a restricted Boltzmann machine according to an embodiment of the present disclosure.

FIG. 3 illustrates a schematic diagram of restricted Boltzmann machine 300 according to an embodiment of the present disclosure. As shown in FIG. 3, restricted Boltzmann machine 300 includes hidden layer 310, first visible layer 320, and second visible layer 330. Hidden layer 310 includes hidden nodes 310-1 and 310-2, first visible layer 320 includes visible layer nodes 320-1 to 320-N, and second visible layer 330 includes visible layer nodes 330-1 to 330-N. According to an embodiment of the present disclosure, first visible layer 320 and second visible layer 330 may also be combined into a single hidden layer.

According to an embodiment of the present disclosure, visible layer nodes 320-1 to 320-N included in first visible layer 320 correspond to questions that are used to train restricted Boltzmann machine 300 and targeted to the answer library corresponding to restricted Boltzmann machine 300, where the values of visible layer nodes corresponding to questions that can be answered by the answer library may be set to 1, and the questions corresponding to these visible layer nodes may be considered as positive samples for training restricted Boltzmann machine 300. In contrast, the values of visible layer nodes corresponding to questions that cannot be answered by the answer library may be set to 0, and the questions corresponding to these visible layer nodes may be considered as negative samples for training restricted Boltzmann machine 300.

According to an embodiment of the present disclosure, computing device 110 obtains a log file collected by the customer service system, which may include information about each answer library and about the questions that can be answered by the answer library. Regarding the log file of the customer service system, the title and description of the question may be used to fill in and submit as a service request to describe the question, and the customer service personnel responsible for answering the question may then attach the appropriate answer library to that question. Not all questions may be labeled with a corresponding answer library, or a label of NA may be used to indicate that no suitable answer library was found. A data set containing all questions may be defined as $SR_{ALL}$, and a data set containing all labeled questions may be defined as $LSR_{ALL}$. As mentioned earlier, the title and description may be concatenated as a complete service request, and the service request is used as input. In the case of foreign languages, all letters in the title and description are converted to lowercase and punctuation marks are deleted.

Computing device 110 may divide the entire log data set into a training data set and an evaluation data set based on the creation time stamps of questions. Accordingly, $SR_{ALL}$ may be divided into a question training data set $SR_{TRAIN}$ and a question evaluation data set $SR_{EVAL}$. The question training data set may be used as a training corpus to train restricted Boltzmann machine 300. Restricted Boltzmann machine 300 may be evaluated on the question evaluation data set in the form of the accuracy of the first n results. When constructing restricted Boltzmann machine 300 for one answer library, some other questions may be selected from another answer library as visible layer nodes, and since questions from the other answer library cannot be answered by the current answer library, the values of these visible layer nodes may be 0.

According to an embodiment of the present disclosure, visible layer nodes 330-1 to 330-N included in second visible layer 330 correspond to visible layer nodes in first visible layer 320, respectively, and are used to represent a training association relationships between the questions corresponding to visible layer nodes in first visible layer 320 and the answer library corresponding to restricted Boltzmann machine 300. The training association relationship may be used to indicate the extent to which the questions can be used to describe the answer library. For example, if a certain question is very representative in the answer library, e.g., a question that is very typical of a class of questions targeted by this answer library, the degree of training association relationship between this question and the answer library is very high. For another example, if a certain question is very highly associated with other questions in the answer library, for example, if the question is semantically very highly associated with most questions in the answer library, the degree of training association relationship between this question and the answer library may also be considered very high.

According to an embodiment of the present disclosure, the training association relationship between the question and the answer library corresponding to restricted Boltzmann machine 300 may be labeled manually or may be determined by the following equation:

$$E_i = \text{sim}(SR, SR_i) \times \text{dis}_{i,c} \times r_i \qquad (8)$$

In Equation (8), $E_i$ denotes the training association relationship between question $SR_i$ with marker i in the answer library and the answer library, and sim(SR, $SR_i$) is the similarity between question $SR_i$ with marker i and all questions SR in the answer library, where sim indicates that this similarity is in the form of cosine similarity. According to some other embodiments of the present disclosure, the similarity between question $SR_i$ with marker i and all other questions SR in the answer library may also be denoted in the form of semantic similarity and the like, and the scope of the present disclosure is not limited in this regard.

Further, in Equation 8, $\text{dis}_{i,c}$ denotes the representative value of question $SR_i$ with marker i with respect to all questions SR in the answer library. It may be determined by, for example, the K-means method or the K nearest neighbor method.

The K-means method, which may also be referred to as the K-means algorithm, is an iteration algorithm that attempts to divide a data set into K predefined different non-overlapping subsets or clusters, where each data point belongs to only one cluster. The K-means method attempts to make data points within a cluster as similar as possible, while keeping the clusters as different as possible. The K-means method assigns data points to a cluster such that the sum of the squared distances between the data points and the centroid of the cluster, i.e., the arithmetic mean value of all data points belonging to that cluster, is minimized, and this is because the smaller the difference in a cluster, the more similar the data points in the same cluster are. The way in which the K-means method works may include: specifying the number of clusters K, initializing the centroid by first shuffling the data set and then randomly selecting K data points as the centroid rather than making replacements, and continuing to iterate until there is no change in the centroid, i.e., no change in the assignment of data points to the clusters. In this process, the sum of squared distances between the data points and all the centroids may be calculated, each data point may be assigned to the nearest cluster or centroid, and the centroid of each cluster may be calculated by taking the average of all the data points belonging to that cluster.

The approach to problem solving using the K-means method is known as expectation maximization. The expectation step or E step is to assign data points to the nearest clusters. The maximization step or M step is to calculate the centroid of each cluster.

It can be seen that the K-means method substantially involves recalculating the centroid of each cluster to reflect the new assignment. Thus, by using the K-means method, it is possible to determine the representative value of question $SR_i$ with marker i with respect to all questions SR in the answer library.

Further, in Equation (8), $r_i$ indicates whether the question $SR_i$ with marker i can be solved by the answer library.

According to an embodiment of the present disclosure, the value of $r_i$ is 1 if the question $SR_i$ with marker i can be solved by the answer library, and the value of $r_i$ is 0 if the question $SR_i$ with marker i cannot be solved by the answer library.

It can be seen that the value of $E_i$ obtained by Equation (8) is between 0 and 1.

According to some other embodiments of the present disclosure, the form of Equation (8) may also be further adapted. For example, Equation (8) may include only one of sim(SR, SRO and $dis_{i,c}$ so that a simplified Equation (8) may be obtained.

Thus, according to an embodiment of the present disclosure, the process of training restricted Boltzmann machine 300 by computing device 110 can be summarized as follows: acquiring the set of questions that can be answered by the answer library as positive samples; acquiring a set of questions that cannot be answered by the answer library as negative samples; acquiring training association relationships between samples in the positive samples and in the negative samples and the answer library; and training restricted Boltzmann machine 300 using the positive samples, the negative samples, and the training association relationships.

Further, according to an embodiment of the present disclosure, computing device 110 may determine the training association relationship based on whether the sample can be answered by the answer library and on one of the following: a similarity between the sample and the positive samples and the negative samples; and a representative value of the sample with respect to the positive samples and the negative samples. Here, the similarity between the sample and the positive samples and the negative samples may be determined using cosine similarity, and the representative value of the sample with respect to the positive samples and the negative samples may be determined using either the K nearest neighbor method or the K-means method.

According to some embodiments of the present disclosure, the training of restricted Boltzmann machine 300 may be based on defining a joint distribution on (v, h) with the foregoing association relationship as the condition, utilizing explainability scores denoted herein as m: $p(h_j=1|v, m)$, $p(v_i=1|h)$, and $p(m_i=1|\overline{h})$ are defined as $p(h_j=1|v, m)=\sigma(a_j+\sum_{i=1}^{n}v_iW_{i,j}+\sum_{i=1}^{n}m_iD_{i,j})$, where a, b, and c are deviations, respectively, and f and n are the numbers of hidden and visible units, respectively. W and D are the weights of the logic function $$\frac{1}{(1+e^{-z})}.$$

According to some embodiments of the present disclosure, an approximation method with different objective function gradients may be used, which may be referred to as contrastive divergence (CD):

$$\Delta W_{ij}=\epsilon_w(<v_ih_j>_{data}-v_ih_j>_{recom}) \quad (9)$$

where $W_{ij}$ is an element in the learned matrix that simulates the influence of the score on h. Learning D is the influence of using CD on the explicability of h and takes a form similar to:

$$\Delta D_{ij}=\epsilon_D(<m_ih_j>_{data}-<m_ih_j>_{recom}) \quad (10)$$

At block 206, computing device 110 determines, using restricted Boltzmann machine 300, annotation information associated with question 120 and targeted to the answer library. According to an embodiment of the present disclosure, the annotation information targeted to the answer library may take a variety of forms.

According to some embodiments of the present disclosure, determining, using restricted Boltzmann machine 300, annotation information associated with question 120 and targeted to the answer library may include: determining a first threshold number of questions in the set of questions that have the highest association with the answer library based on the association relationships between the questions in the set of questions and the answer library. For example, as previously described, since restricted Boltzmann machine 300 can be used to determine association relationships between questions that the answer library associated with restricted Boltzmann machine 300 can answer and that answer library and these association relationships can be quantified as a value between 0 and 1, multiple, e.g., 10, 5, or 1, question(s) with the highest association in the set of questions that the answer library associated with the restricted Boltzmann machine 300 can answer can be easily determined by sorting.

According to some embodiments of the present disclosure, determining, using restricted Boltzmann machine 300, annotation information associated with question 120 and targeted to the answer library may include: determining questions in the set of questions that have associations higher than a threshold association with the answer library based on the association relationships between the questions in the set of questions and the answer library. For example, as previously described, since restricted Boltzmann machine 300 can be used to determine association relationships between questions that the answer library associated with restricted Boltzmann machine 300 can answer and that answer library and these association relationships can be quantified as a value between 0 and 1, questions with associations reaching a predetermined value, e.g., 0.8, in the set of questions that the answer library associated with the restricted Boltzmann machine 300 can answer can be easily determined by sorting.

According to some other embodiments of the present disclosure, determining, using restricted Boltzmann machine 300, annotation information associated with question 120 and targeted to the answer library may include: determining a second threshold number of questions in the set of questions that have the highest association with question 120. For example, the semantic similarity may be used to determine multiple, e.g., 10, 5, or 1, question(s) that are most similar to to-be-solved question 120 among the questions involved in the answer library associated with restricted Boltzmann machine 300.

According to an embodiment of the present disclosure, after computing device 110 has determined the answer library associated with question 120 at block 202 and has determined, using restricted Boltzmann machine 300, the annotation information associated with question 120 and targeted to the answer library at block 206, it may additionally provide the determined answer library and annotation information to the customer service personnel. According to some embodiments of the present disclosure, computing device 110 may provide the annotation information in the form of, for example, "This answer library can also answer the following questions" and list the questions that can be answered or the identifiers of those questions. According to some other embodiments of the present disclosure, computing device 110 may provide the annotation information in the form of, for example, "Question 120 is more relevant to the following questions in this answer library" and list those questions or the identifiers of those questions.

Related contents of example question answering environment 100 in which the device and/or method according to embodiments of the present disclosure may be implemented, question answering method 200 according to an embodiment of the present disclosure, and restricted Boltzmann machine 300 according to an embodiment of the present disclosure are described above with reference to FIG. 1 to FIG. 3. It should be understood that the above description is to better demonstrate the content recorded in embodiments of the present disclosure, and is not intended to limit the present disclosure in any way.

It should be understood that the numbers of various elements and the magnitudes of physical quantities used in embodiments of the present disclosure and the drawings are only examples, and are not intended to limit the protection scope of embodiments of the present disclosure. The above numbers and magnitudes may be arbitrarily set as needed without affecting the normal implementation of embodiments of the present disclosure.

Through the above description with reference to FIGS. 1 through 3, a collaborative filtering recommendation method based on a restricted Boltzmann machine is provided according to the technical solution of embodiments of the present disclosure. With this method, by using a set of questions that can be answered by the answer library as positive samples and using a set of questions that cannot be answered by the answer library as negative samples, acquiring training association relationships between samples in the positive samples and in the negative samples and the answer library, and training a restricted Boltzmann machine using the positive samples, the negative samples, and the training association relationships, it is possible to enable the trained restricted Boltzmann machine to be used to determine a set of questions that the answer library can answer and association relationships between questions in the set of questions and the answer library. Thus, annotation information associated with the question and targeted to the answer library can be determined using the trained restricted Boltzmann machine.

Specifically, the technical solutions according to embodiments of the present disclosure have many advantages compared with conventional solutions.

For example, with the technical solution of the present disclosure, it is possible to provide the customer service personnel with the determined annotation information to enable the customer service personnel to have a more thorough understanding of the determined answer library and obtain targeted recommendation information, thus improving the user experience of the customer service personnel that uses the question answering system.

For another example, using the technical solution of the present disclosure, a restricted Boltzmann machine for each answer library can be easily established and trained, so that a restricted Boltzmann machine can be easily realized which takes into account both the set of questions that the answer library can answer and the association relationships between the questions in the set of questions and the answer library, and annotation information associated with the question and targeted to the answer library can be determined and provided according to various preset requirements.

The technical effects of the question answering method according to embodiments of the present disclosure in comparison to conventional solutions are described below in connection with a comparative example.

Figure 4:
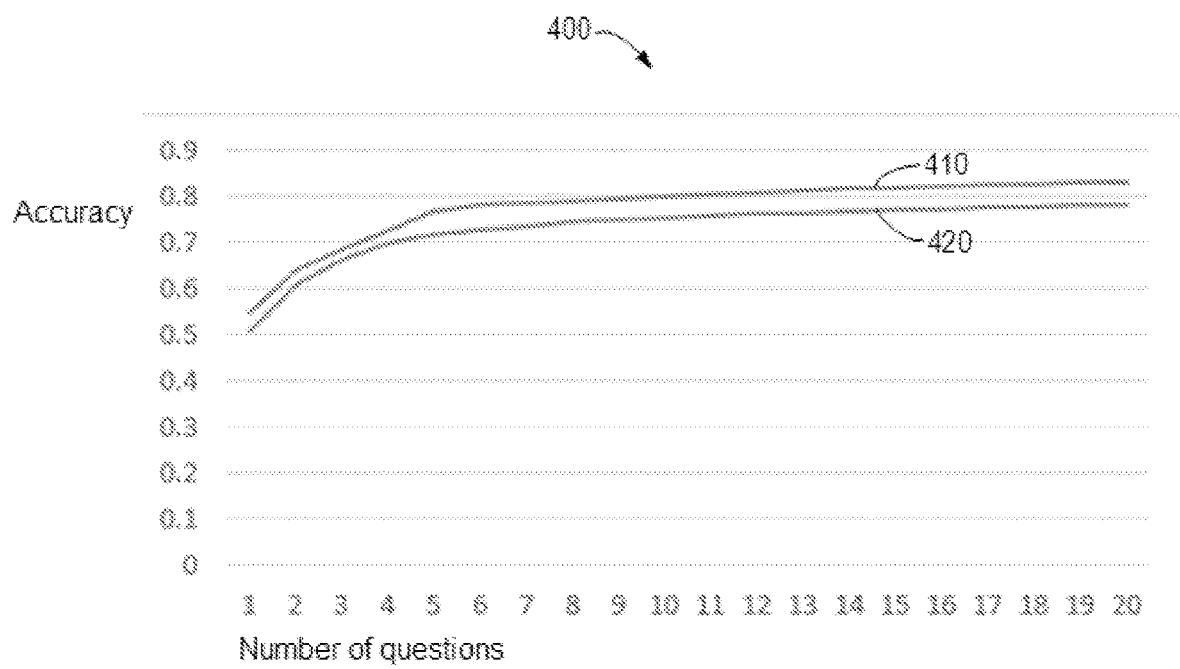
FIG. 4 illustrates a schematic diagram of a comparison of accuracy according to an embodiment of the present disclosure.

FIG. 4 illustrates a schematic diagram of comparison of accuracy 400 according to an embodiment of the present disclosure. In FIG. 4, the horizontal coordinate is the number of questions provided, for example, when providing questions with the highest association with the answer library among the set of questions, and the vertical coordinate is the accuracy rate converted to decimals, where 410 is the accuracy rate achieved using the technical solution of the present disclosure, and 420 is the accuracy rate achieved using conventional technical solutions that do not consider the annotation information associated with the question and targeted to the answer library.

As can be seen in FIG. 4, it is possible to use the technical solution of the present disclosure to achieve significantly better accuracy rates than conventional techniques for different numbers of questions to be provided.

Figure 5:
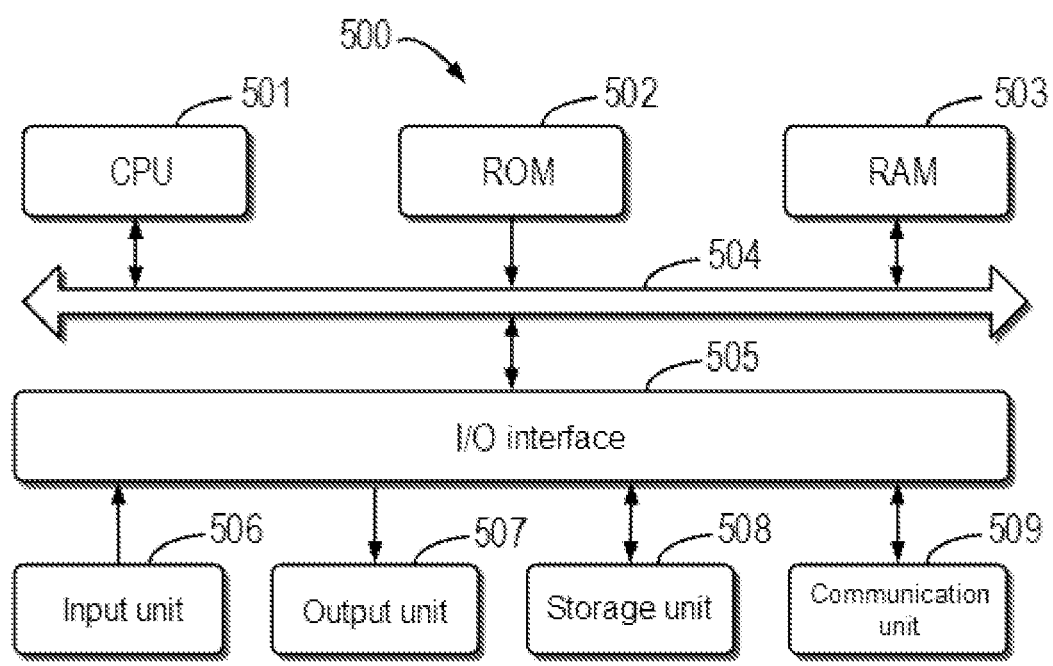
FIG. 5 illustrates a schematic block diagram of an example device that may be used to implement embodiments of the present disclosure.

FIG. 5 illustrates a schematic block diagram of example device 500 that may be used to implement embodiments of the present disclosure. According to an embodiment of the present disclosure, computing device 110 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for the operation of the device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing of method 200 described above, for example, may be performed by CPU 501. For example, in some embodiments, method 200 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

Embodiments of the present disclosure may relate to a method, a device, a system, and/or a computer program product. The computer program product may include a computer-readable storage medium on which computer-readable program instructions for performing various aspects of embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer over any kind of networks, including a LAN or a WAN, or may be connected to an external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of embodiments of the present disclosure.

Various aspects of embodiments of the present disclosure are described herein with reference to flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method, comprising:
   implementing, in a processor-based recommendation system, a plurality of restricted Boltzmann machines for respective ones of a plurality of answer libraries, wherein each of the restricted Boltzmann machines comprises at least a plurality of hidden nodes, a plurality of visible nodes of a first type, corresponding to respective questions used to train that restricted Boltzmann machine, and a plurality of visible nodes of a second type, different than the first type and corresponding to respective association relationships between the questions used to train that restricted Boltzmann machine and the answer library;

determining, in the processor-based recommendation system, an answer library associated with a question corresponding to a service request received by the processor-based recommendation system;

determining, in the processor-based recommendation system, a restricted Boltzmann machine associated with the answer library, wherein the restricted Boltzmann machine is configured to determine a set of questions that the answer library can answer and association relationships between questions in the set of questions and the answer library;

determining, in the processor-based recommendation system and using the restricted Boltzmann machine associated with the answer library, annotation information associated with the question and targeted to the answer library; and generating, in the processor-based recommendation system, a recommendation for responding to the service request based on the annotation information.

2. The method according to claim 1, wherein determining the answer library associated with the question comprises:
   determining the answer library associated with the question based on at least one of the following:
   an association between the question and questions that can be answered by the answer library; and
   an association between the question and the answer library.

3. The method according to claim 1, further comprising:
   training the restricted Boltzmann machine by the following steps:
   acquiring the set of questions that can be answered by the answer library as positive samples;
   acquiring a set of questions that cannot be answered by the answer library as negative samples;
   acquiring training association relationships between samples in the positive samples and in the negative samples and the answer library; and
   training the restricted Boltzmann machine using the positive samples, the negative samples, and the training association relationships.

4. The method according to claim 3, wherein acquiring the training association relationships between the samples in the positive samples and in the negative samples and the answer library comprises:
   determining the training association relationship based on whether the sample can be answered by the answer library and on one of the following:
   a similarity between the sample and the positive samples and the negative samples; and
   a representative value of the sample with respect to the positive samples and the negative samples.

5. The method according to claim 4, further comprising:
   determining the similarity using a cosine similarity.

6. The method according to claim 4, further comprising:
   determining the representative value using one of the following:
   a K nearest neighbor method; and
   a K-means method.

7. The method according to claim 1, wherein determining the annotation information associated with the question and targeted to the answer library comprises:
   determining a first threshold number of questions in the set of questions that have the highest association with the answer library based on the association relationships between the questions in the set of questions and the answer library.

8. The method according to claim 1, wherein determining the annotation information associated with the question and targeted to the answer library comprises:
   determining questions in the set of questions that have associations higher than a threshold association with the answer library based on the association relationships between the questions in the set of questions and the answer library.

9. The method according to claim 1, wherein determining the annotation information associated with the question and targeted to the answer library comprises:
   determining a second threshold number of questions in the set of questions that have the highest association with the question.

10. An electronic device, comprising:
    at least one processing unit; and
    at least one memory coupled to the at least one processing unit and storing instructions for execution by the at least one processing unit, wherein the instructions, when executed by the at least one processing unit, cause the device to perform actions comprising:
    implementing, in a processor-based recommendation system, a plurality of restricted Boltzmann machines for respective ones of a plurality of answer libraries, wherein each of the restricted Boltzmann machines comprises at least a plurality of hidden nodes, a plurality of visible nodes of a first type, corresponding to respective questions used to train that restricted Boltzmann machine, and a plurality of visible nodes of a second type, different than the first type and corresponding to respective association relationships between the questions used to train that restricted Boltzmann machine and the answer library;
    determining, in the processor-based recommendation system, an answer library associated with a question corresponding to a service request received by the processor-based recommendation system;
    determining, in the processor-based recommendation system, a restricted Boltzmann machine associated with the answer library, wherein the restricted Boltzmann machine is configured to determine a set of questions that the answer library can answer and association relationships between questions in the set of questions and the answer library;
    determining, in the processor-based recommendation system and using the restricted Boltzmann machine associated with the answer library, annotation information associated with the question and targeted to the answer library; and
    generating, in the processor-based recommendation system, a recommendation for responding to the service request based on the annotation information.

11. The electronic device according to claim 10, wherein determining the answer library associated with the question comprises:
    determining the answer library associated with the question based on at least one of the following:
    an association between the question and questions that can be answered by the answer library; and
    an association between the question and the answer library.

12. The electronic device according to claim 10, wherein the actions further comprise:
training the restricted Boltzmann machine by the following steps:
acquiring the set of questions that can be answered by the answer library as positive samples;
acquiring a set of questions that cannot be answered by the answer library as negative samples;
acquiring training association relationships between samples in the positive samples and in the negative samples and the answer library; and
training the restricted Boltzmann machine using the positive samples, the negative samples, and the training association relationships.

13. The electronic device according to claim 12, wherein acquiring the training association relationships between the samples in the positive samples and in the negative samples and the answer library comprises:
determining the training association relationship based on whether the sample can be answered by the answer library and on one of the following:
a similarity between the sample and the positive samples and the negative samples; and
a representative value of the sample with respect to the positive samples and the negative samples.

14. The electronic device according to claim 13, wherein the actions further comprise:
determining the similarity using a cosine similarity.

15. The electronic device according to claim 13, wherein the actions further comprise:
determining the representative value using one of the following:
a K nearest neighbor method; and
a K-means method.

16. The electronic device according to claim 10, wherein determining the annotation information associated with the question and targeted to the answer library comprises:
determining a first threshold number of questions in the set of questions that have the highest association with the answer library based on the association relationships between the questions in the set of questions and the answer library.

17. The electronic device according to claim 10, wherein determining the annotation information associated with the question and targeted to the answer library comprises:
determining questions in the set of questions that have associations higher than a threshold association with the answer library based on the association relationships between the questions in the set of questions and the answer library.

18. The electronic device according to claim 10, wherein determining the annotation information associated with the question and targeted to the answer library comprises:
determining a second threshold number of questions in the set of questions that have the highest association with the question.

19. A computer program product tangibly stored on a non-transitory computer-readable medium and comprising machine-executable instructions, wherein the machine-executable instructions, when executed by a machine, cause the machine to perform actions comprising:
implementing, in a processor-based recommendation system, a plurality of restricted Boltzmann machines for respective ones of a plurality of answer libraries, wherein each of the restricted Boltzmann machines comprises at least a plurality of hidden nodes, a plurality of visible nodes of a first type, corresponding to respective questions used to train that restricted Boltzmann machine, and a plurality of visible nodes of a second type, different than the first type and corresponding to respective association relationships between the questions used to train that restricted Boltzmann machine and the answer library;
determining, in the processor-based recommendation system, an answer library associated with a question corresponding to a service request received by the processor-based recommendation system;
determining, in the processor-based recommendation system, a restricted Boltzmann machine associated with the answer library, wherein the restricted Boltzmann machine is configured to determine a set of questions that the answer library can answer and association relationships between questions in the set of questions and the answer library;
determining, in the processor-based recommendation system and using the restricted Boltzmann machine associated with the answer library, annotation information associated with the question and targeted to the answer library; and
generating, in the processor-based recommendation system, a recommendation for responding to the service request based on the annotation information.

20. The computer program product according to claim 19, wherein determining the answer library associated with the question comprises:
determining the answer library associated with the question based on at least one of the following:
an association between the question and questions that can be answered by the answer library; and
an association between the question and the answer library.

* * * * *